United States Patent
Lim et al.

(10) Patent No.: US 12,388,630 B2
(45) Date of Patent: Aug. 12, 2025

(54) QUANTUM KEY DISTRIBUTION SYSTEM AND OPERATION METHOD THEREOF

(71) Applicant: ELECTRONICS AND TELECOMMUNICATIONS RESEARCH INSTITUTE, Daejeon (KR)

(72) Inventors: Kyongchun Lim, Daejeon (KR); Chun Ju Youn, Daejeon (KR); Joong-Seon Choe, Daejeon (KR); Minchul Kim, Daejeon (KR); Byung-seok Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 425 days.

(21) Appl. No.: 17/937,325

(22) Filed: Sep. 30, 2022

(65) Prior Publication Data
US 2023/0283459 A1 Sep. 7, 2023

(30) Foreign Application Priority Data
Mar. 3, 2022 (KR) .................. 10-2022-0027108

(51) Int. Cl.
*H04L 9/08* (2006.01)
(52) U.S. Cl.
CPC .................. *H04L 9/0852* (2013.01)
(58) Field of Classification Search
CPC .................................................. H04L 9/0852
See application file for complete search history.

(56) References Cited

U.S. PATENT DOCUMENTS 6,631,302 B1 * 10/2003 Wilson ............... G11B 7/22
369/112.01
9,819,418 B2 * 11/2017 Nordholt ............ H04B 10/501
(Continued)

FOREIGN PATENT DOCUMENTS

KR 10-2018-0102477 A 9/2018

OTHER PUBLICATIONS

Higgins, Brendon L., Jean-Philippe Bourgoin, and Thomas Jennewein. "Numeric estimation of resource requirements for a practical polarization-frame alignment scheme for quantum key distribution (QKD)." Advanced Optical Technologies 9.5 (2020): 253-261. (Year: 2020).*
(Continued)

*Primary Examiner* — Harris C Wang

(57) ABSTRACT

A quantum key distribution system using an RFI (reference frame independent) QKD (quantum key distribution) protocol includes a quantum channel transmitter that generates a first quantum signal including quantum information and provides the first quantum signal to an external device through a quantum channel, a first public channel transceiver that generates an optical signal including first additional information related to a QKD operation, and transmits and receives the optical signal through a public channel, a second public channel transceiver that receives the optical signal through the public channel and generates a measurement result by measuring a circular polarization component of the optical signal, and a quantum channel receiver that receives the first quantum signal through the quantum channel, generates a second quantum signal by correcting a polarization distortion of the first quantum signal based on the measurement result, and demodulates the quantum information from the second quantum signal.

15 Claims, 7 Drawing Sheets

(56) References Cited

U.S. PATENT DOCUMENTS

| | | | |
|---|---|---|---|
| 10,887,094 B2 | 1/2021 | Ji | |
| 11,238,428 B1* | 2/2022 | Nagarajan | H04L 9/0618 |
| 2012/0269345 A1* | 10/2012 | Ukita | H04K 1/08 |
| | | | 380/256 |
| 2015/0326391 A1* | 11/2015 | Cho | H04L 9/12 |
| | | | 380/278 |
| 2020/0014533 A1* | 1/2020 | Fung | H04L 5/0007 |
| 2021/0083863 A1* | 3/2021 | Bush | H04L 9/0852 |
| 2021/0306077 A1 | 9/2021 | Lim | |
| 2022/0141008 A1* | 5/2022 | Lim | H04L 9/0855 |
| | | | 380/278 |
| 2022/0231845 A1* | 7/2022 | Shin | G02B 5/3025 |
| 2023/0141134 A1* | 5/2023 | Knarr | H04L 9/0858 |
| | | | 713/171 |
| 2023/0283459 A1* | 9/2023 | Lim | H04L 9/0852 |
| | | | 713/168 |
| 2023/0393335 A1* | 12/2023 | Challener | H04L 9/0852 |

OTHER PUBLICATIONS

Sheng-Kai Liao et al., "Satellite-to-ground quantum key distribution," Nature, 2017.

Kyongchun Lim et al., "Countermeasure for security loophole caused by asymmetric correlations of reference frame independent quantum key distribution with fewer quantum states," Optics Express 18966, Jun. 2021, vol. 29, No. 1.

Hongwei Liu et al., "Reference-Frame-Independent Quantum Key Distribution Using Fewer States," Physical Review Applied 12, Sep. 2019, 034039.

\* cited by examiner

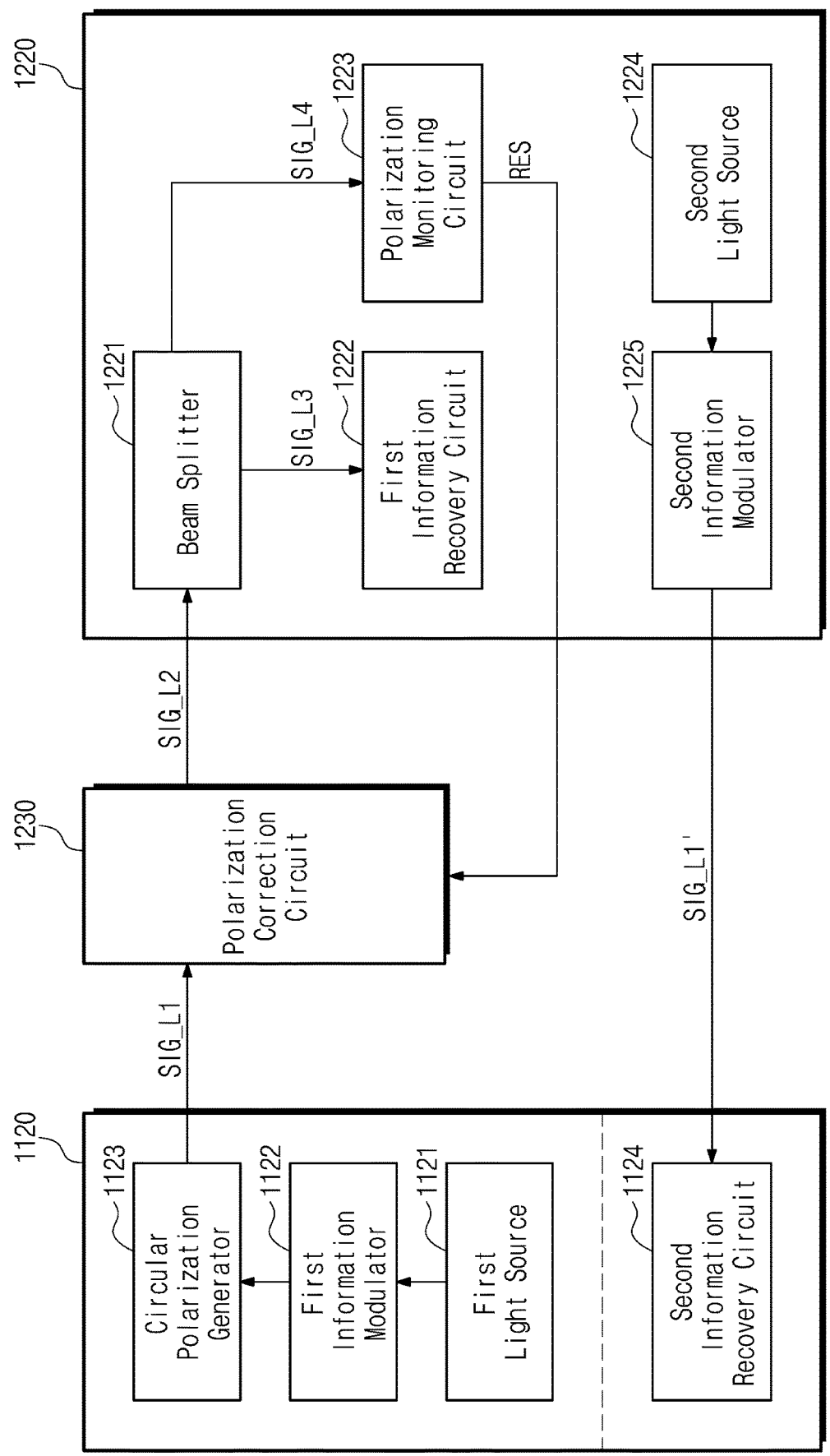

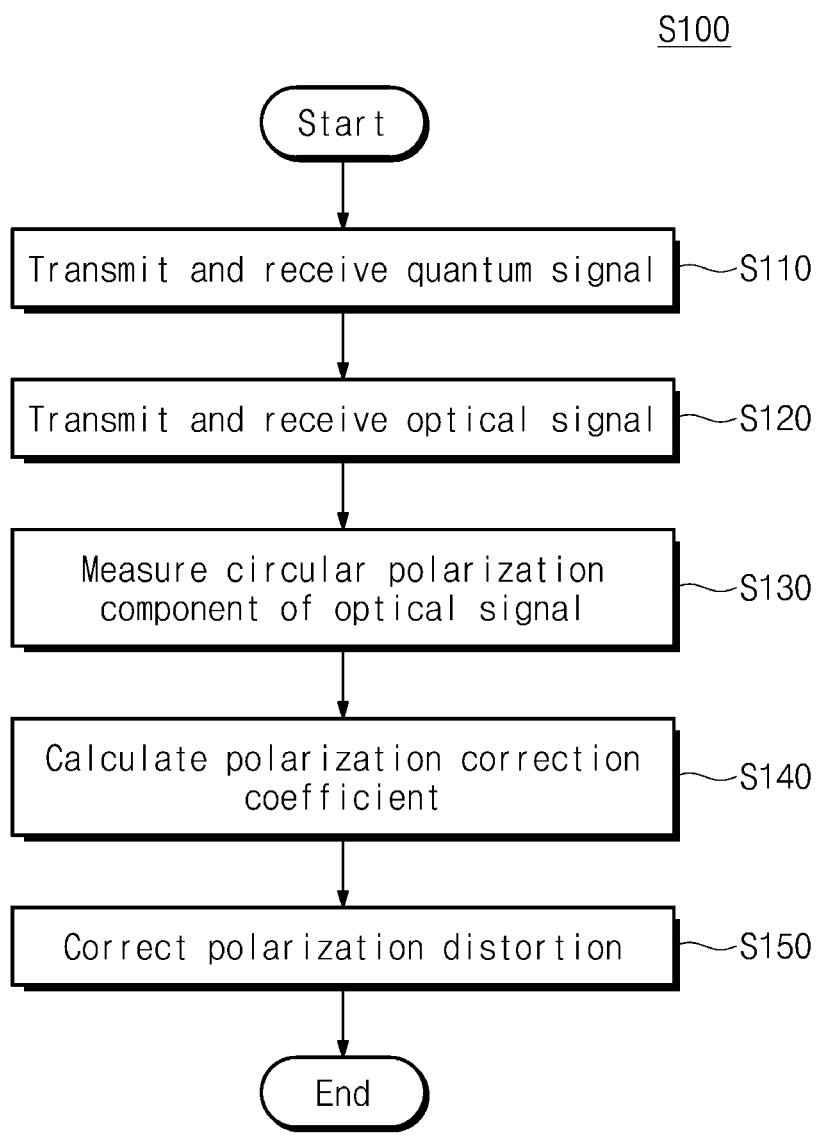

QUANTUM KEY DISTRIBUTION SYSTEM AND OPERATION METHOD THEREOF

CROSS-REFERENCE TO RELATED APPLICATIONS

This application claims priority under 35 U.S.C. § 119 to Korean Patent Application No. 10-2022-0027108, filed on Mar. 3, 2022, in the Korean Intellectual Property Office, the disclosures of which are incorporated by reference herein in their entireties.

BACKGROUND

Embodiments of the present disclosure described herein relate to a quantum key distribution (QKD) system, and more particularly, relate to a quantum key distribution system based on a reference frame independent (RFI) QKD protocol that operates independently of a reference axis and an operation method thereof.

Most of the encryption systems currently used for communication are based on mathematical complexity and are reversible, so someday the encryption will be solved. One of the techniques for resolving this problem is quantum cryptography communication, in particular, a quantum key distribution (QKD) technique. Whereas most existing encryption systems are mostly based on mathematical complexity, the quantum cryptography is based on natural phenomena and is one of the ideal methods to generate one-time encryption keys used in encryption. When an eavesdropper (Eve) intrudes during quantum cryptography communication, its existence is revealed, and the signal is distorted, so the eavesdropper cannot obtain accurate information. The QKD system is a system that allows the transmitter (Alice) and the receiver (Bob) to share a quantum cryptography with these characteristics.

The QKD protocol is a means to enable symmetric key-based quantum cryptography communication that provides unconditional security using quantum mechanical properties. For the symmetric key-based quantum encryption communication, the transceiver, which is the subject of communication, should share the same encryption key. The QKD protocol serves to securely share the encryption keys. In the QKD protocol, cryptographic key information uses the physical properties of photons such as polarization or phase, and these properties have relative values. Therefore, the encryption key information is defined based on a specific reference axis between the transceiver. The QKD protocol exchanges the encryption key information based on the initially defined reference axis, and the reference axis may change in real time due to the influence of the external environment. This impedes the sharing of the same encryption key information. To solve this issue, the RFI QKD protocol that operates independently of the reference axis has been proposed.

SUMMARY

Embodiments of the present disclosure provide a QKD system capable of correcting a polarization distortion to accurately receive a circular polarization in an RFI QKD protocol and an operation method thereof.

According to an embodiment of the present disclosure, a quantum key distribution system uses an RFI (reference frame independent) QKD (quantum key distribution) protocol. A quantum key distribution system includes a quantum channel transmitter that generates a first quantum signal including quantum information and provides the first quantum signal to an external device through a quantum channel, a first public channel transceiver that generates an optical signal including first additional information related to a QKD operation, and transmits and receives the optical signal through a public channel, a polarization correction circuit that receives the first quantum signal through the quantum channel and receives the optical signal through the public channel, a second public channel transceiver that receives the optical signal from the polarization correction circuit and generates a measurement result by measuring a circular polarization component of the optical signal, and a quantum channel receiver that receives a second quantum signal obtained by correcting a polarization distortion of the first quantum signal from the polarization correction circuit, and demodulates the quantum information from the second quantum signal. The polarization correction circuit may be further configured to generate the second quantum signal by correcting the polarization distortion of the first quantum signal based on the measurement result.

According to an embodiment, the quantum channel transmitter may include a light source that generates a single photon or coherent light, an intensity modulator connected to the light source and that adjusts an intensity of the coherent light, a quantum information modulator that modulates the single photon or coherent light, and an optical attenuator that attenuates an intensity of a signal output from the quantum information modulator to generate the first quantum signal.

According to an embodiment, the quantum channel receiver may include a quantum information demodulator that demodulates the quantum information from the second quantum signal, and a single photon detector that detects the second quantum signal to measure a polarization state of the second quantum signal.

According to an embodiment, the polarization correction circuit may include a polarization correction coefficient calculator that receives the measurement result and calculates a polarization correction coefficient associated with a circular polarization basis based on the measurement result, a signal controller that generates a polarization adjustment signal based on the polarization correction coefficient, and a polarization adjuster that adjusts a polarization of the first quantum signal in response to the polarization adjustment signal and generates the second quantum signal.

According to an embodiment, the first public channel transceiver may include a first laser light source that generates the optical signal, a first information modulator coupled to the first laser light source and that assigns the first additional information to the optical signal, and a circular polarization generator connected to the first information modulator to convert a polarization of the optical signal into a circular polarization.

According to an embodiment, the first additional information may include at least one of post-processing related information, synchronization information, and location information of a transceiver.

According to an embodiment, the second public channel transceiver may include a beam splitter that receives the optical signal through the public channel and splits the optical signal into a first optical signal and a second optical signal, a first information recovery circuit that receives the first optical signal from the beam splitter and recovers the first additional information from the first optical signal, and a polarization monitoring circuit that receives the second optical signal from the beam splitter and measures the circular polarization component from the second optical signal.

According to an embodiment, the polarization monitoring circuit may include a quarter wave plate that changes a polarization state of the second optical signal, a polarization beam splitter that splits the second optical signal based on the polarization state, and an optical power meter that measures an intensity of a splitted optical signal to generate the measurement result associated with the circular polarization component.

According to an embodiment, the second public channel transceiver may further include a second laser light source that generates an optical response signal to be transmitted to the first public channel transceiver in response to the optical signal, and a second information modulator that assigns second additional information related to the QKD to the optical response signal.

According to an embodiment, the first public channel transceiver may further include a second information recovery circuit that receives the optical response signal and recovers the second additional information from the optical response signal.

According to an embodiment, an operation method of a quantum key distribution system is operated based on an RFI (reference frame independent) QKD (quantum key distribution) protocol. The operation method of a quantum key distribution system includes generating, by a quantum channel transmitter, a first quantum signal including quantum information and transmitting the generated first quantum signal to a quantum channel, generating, by a first public channel transceiver, an optical signal including additional information related to a QKD operation, and transmitting the optical signal to a public channel, receiving, by a polarization correction circuit, the first quantum signal through the quantum channel and receiving the optical signal through the public channel, receiving, by a second public channel transceiver, the optical signal from the polarization correction circuit, generating, by the second public channel transceiver, a measurement result by measuring a circular polarization component from the optical signal, generating, by the polarization correction circuit, a second quantum signal by correcting a polarization distortion of the first quantum signal based on the measurement result, and demodulating, by a quantum channel receiver, the quantum information from the second quantum signal.

According to an embodiment, the transmitting of the optical signal to the public channel may include making a polarization of the optical signal into a circular polarization.

According to an embodiment, the generating of the measurement result may include splitting the optical signal into a first optical signal and a second optical signal, recovering the additional information from the first optical signal, and measuring the circular polarization component from the second optical signal.

According to an embodiment, the additional information may include at least one of post-processing related information, synchronization information, and location information of a transceiver.

According to an embodiment, the correcting of the polarization distortion may include calculating a polarization correction coefficient associated with a circular polarization basis based on the measurement result, generating a polarization adjustment signal based on the polarization correction coefficient, and adjusting a polarization of the quantum signal in response to the polarization adjustment signal.

BRIEF DESCRIPTION OF THE FIGURES

The above and other objects and features of the present disclosure will become apparent by describing in detail embodiments thereof with reference to the accompanying drawings.

FIG. 6 is a block diagram illustrating another example of a first public channel transceiver and a second public channel transceiver of FIG. 1.

FIG. 7 is a flowchart illustrating a method of operating a quantum key distribution system, according to an embodiment of the present disclosure.

DETAILED DESCRIPTION

Hereinafter, embodiments of the present disclosure will be described clearly and in detail such that those skilled in the art may easily carry out the present disclosure. However, since the present disclosure may be embodied in various different forms within the scope of the claims, the embodiments described below are merely examples regardless of whether they are expressed or not. That is, the present disclosure is not limited to the embodiments disclosed below and may be implemented in various different forms.

Figure 1:
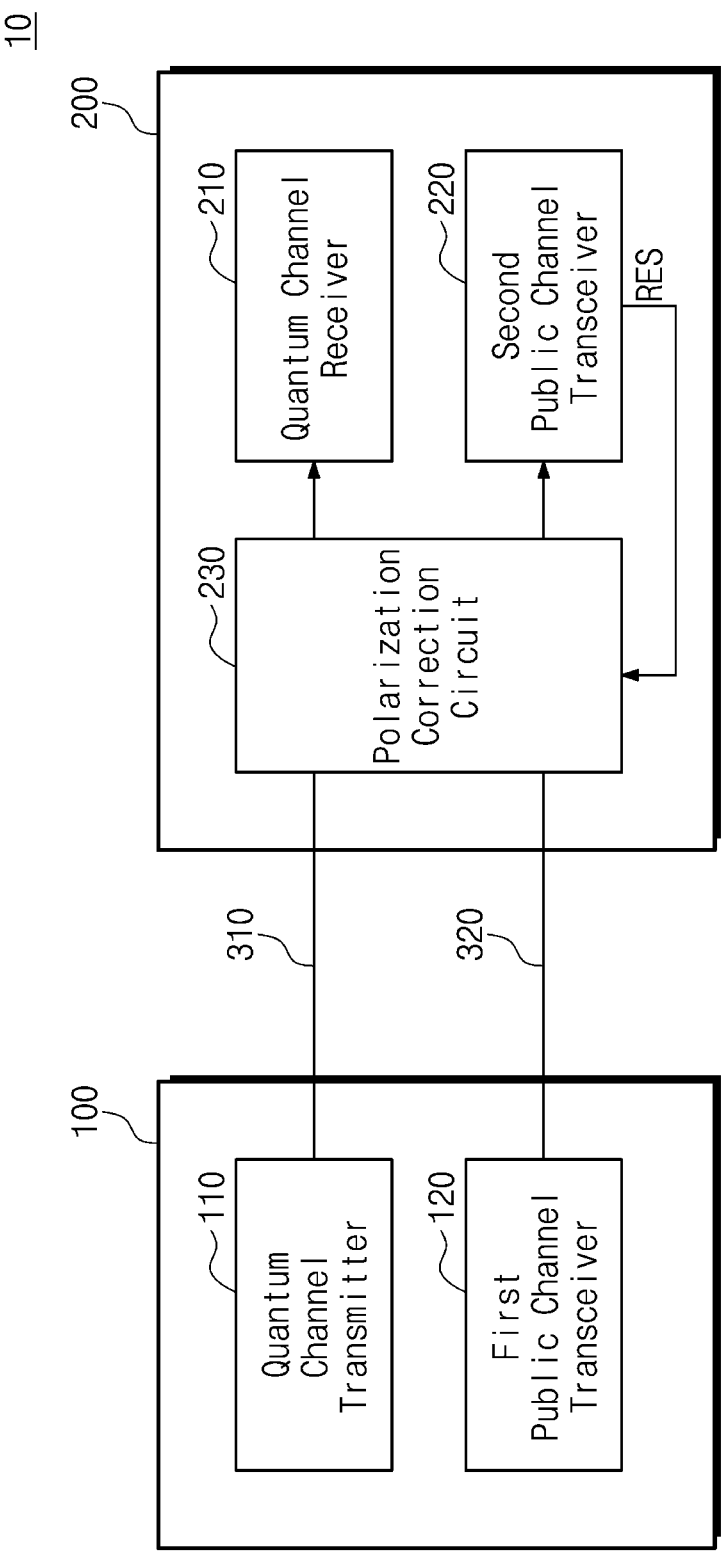
FIG. 1 is a block diagram of a quantum key distribution system according to an embodiment of the present disclosure.

FIG. 1 is a block diagram of a quantum key distribution system according to an embodiment of the present disclosure. Referring to FIG. 1, a quantum key distribution (QKD) system 10 may include a transmitting device 100, a receiving device 200, a quantum channel 310, and a public channel 320 (or open channel).

The QKD system 10 may perform quantum cryptographic communication through an RFI QKD protocol. That is, the transmitting device 100 and the receiving device 200 may distribute the encryption key according to the reference frame independent (RFI) QKD protocol. The transmitting device 100 and the receiving device 200 may share encryption key information regardless of the reference axis between the transmitting device 100 and the receiving device 200 through the RFI QKD protocol.

For example, a polarization-based RFI QKD protocol may use two circular polarizations in addition to four linear polarizations. The linear polarization may have physical properties (0°, 90°, 45°, and −45°) related to the reference axis, and the circular polarization may have physical properties (left circle, right circle) independent of the reference axis. Hereinafter, a combination of mutually orthogonal polarization states is defined as a basis, 0° and 90° polarizations are defined as a Z basis, 45° and −45° polarizations are defined as an X basis, and the left circular and the right circular polarizations are defined as a Y basis.

There is no impact on the performance of the RFI QKD protocol even if the linear polarization component (0°, 90°, 45°, and −45°) changes to another linear polarization component due to optical alignment and external environment. However, when the linear polarization component starts to have the circular polarization component, it may impact the performance of the RFI QKD protocol. This means that the right or left circular polarization used in the RFI QKD protocol has the linear polarization component. Therefore, when using the RFI QKD protocol, the receiving device 200 may correct polarization distortion to accurately receive the circular polarization.

The transmitting device 100 may include a quantum channel transmitter 110 and a first public channel transceiver 120. The quantum channel transmitter 110 may generate a single photon or coherent light depending on a type of the light source (e.g., a light source 111 of FIG. 2), and may perform a modulation operation to modulate the quantum information to the generated single photon or the generated coherent light. The quantum channel transmitter 110 may transmit a quantum signal to the receiving device 200 through the quantum channel 310. The quantum signal may include a single photon in which quantum information is modulated or the coherent light having an intensity of a single photon level.

The first public channel transceiver 120 may be connected to the receiving device 200 through the public channel 320 to share additional information related to quantum key distribution with the receiving device 200. For example, the first public channel transceiver 120 may share post-processing related information including sifting, error correction (e.g., QBER), privacy amplification, etc. with the receiving device 200. In addition, the first public channel transceiver 120 may share synchronization information and location information of a transceiver with the receiving device 200. The first public channel transceiver 120 may transmit an optical signal having circular polarization to the receiving device 200 through the public channel 320.

The receiving device 200 may include a quantum channel receiver 210, a second public channel transceiver 220, and a polarization correction circuit 230. The quantum channel receiver 210 may receive a quantum signal transmitted from the quantum channel transmitter 110 through the quantum channel 310 and the polarization correction circuit 230 and may perform a demodulation operation on the quantum signal.

The second public channel transceiver 220 may be connected to the transmitting device 100 through the public channel 320 and the polarization correction circuit 230 to share additional information related to the quantum key distribution with the transmitting device 100. For example, the additional information related to the quantum key distribution may include at least one of post-processing related information, synchronization information, and location information of a transceiver.

The second public channel transceiver 220 may measure a polarization-distorted optical signal due to the public channel 320. In detail, the second public channel transceiver 220 may measure the degree of distortion of the circular polarization of the optical signal and may generate a circular polarization measurement result RES as a result. The second public channel transceiver 220 may provide the circular polarization measurement result RES to the polarization correction circuit 230. A detailed description thereof will be described later with reference to FIG. 5.

According to an embodiment, the first public channel transceiver 120 and the second public channel transceiver 220 may share post-processing information, and may perform an error correction operation and a privacy amplification operation based on the post-processing information.

The polarization correction circuit 230 may adjust the polarization of the quantum signal based on the circular polarization measurement result RES received from the second public channel transceiver 220. The polarization correction circuit 230 may only correct polarization distortion with respect to the circular polarization basis based on the circular polarization measurement result RES. Accordingly, pre-processing to correct polarization distortion or additional real-time information sharing is not required, and real-time polarization correction is possible. A detailed description thereof will be described later with reference to FIG. 3.

Figure 2:
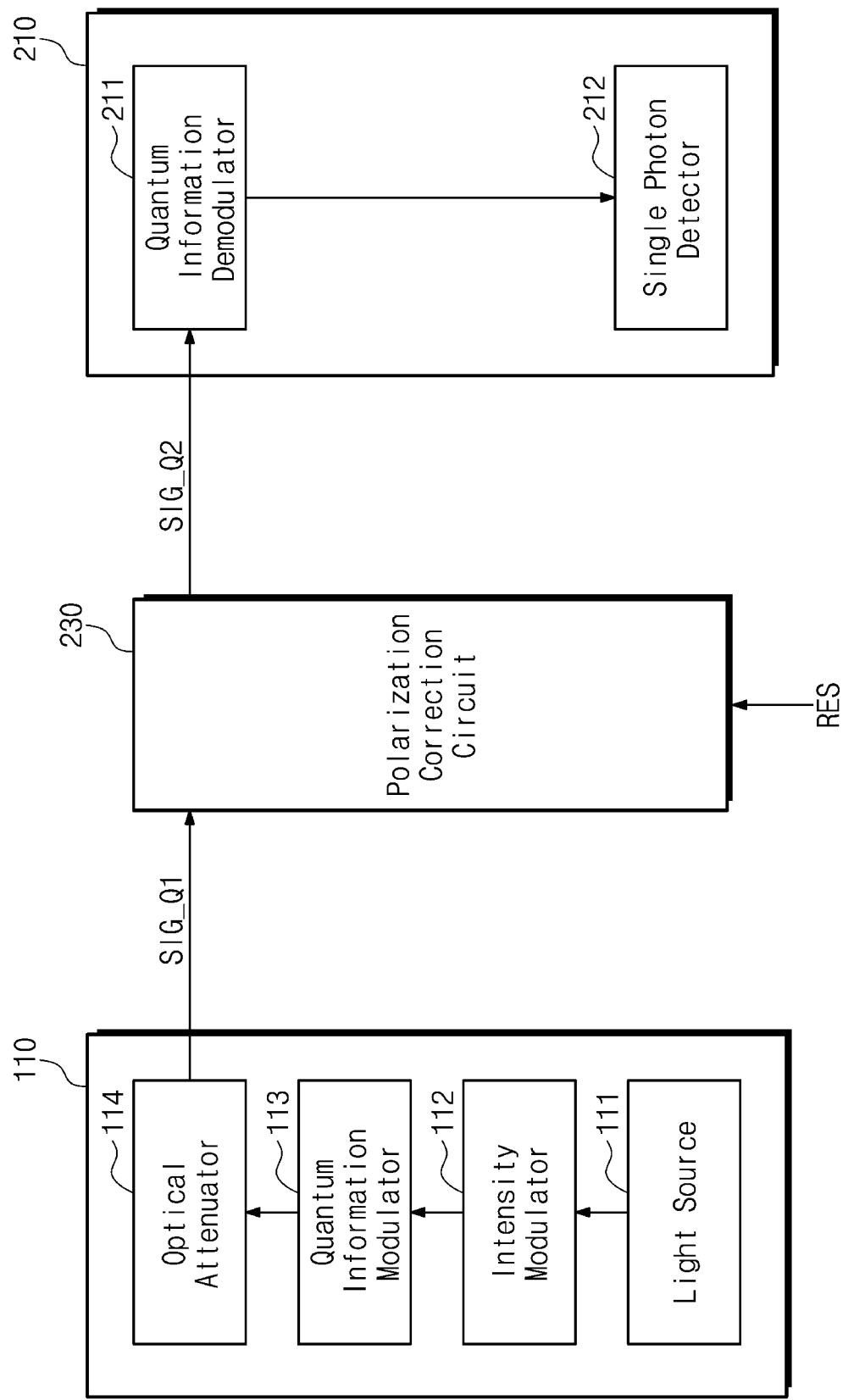
FIG. 2 is a block diagram illustrating an example of a quantum channel transmitter and a quantum channel receiver of FIG. 1.

FIG. 2 is a block diagram illustrating an example of a quantum channel transmitter and a quantum channel receiver of FIG. 1. Referring to FIGS. 1 and 2, the quantum channel transmitter 110 may include the light source 111, an intensity modulator 112, a quantum information modulator 113, and an optical attenuator 114, and the quantum channel receiver 210 may include a quantum information demodulator 211 and a single photon detector 212.

The light source 111 may generate a single photon or coherent light. According to an embodiment, the light source 111 may include a laser in which emitted light is a single mode, and has a narrow linewidth and stable polarization characteristics. A single photon or coherent light generated from the light source 111 may be incident on the intensity modulator 112. The intensity modulator 112 may be connected to the light source 111 to adjust the intensity of a coherent light. For example, the intensity modulator 112 may amplify the intensity of a coherent light.

The quantum information modulator 113 may be connected to the intensity modulator 112 to modulate (or impart) quantum information to a single photon or coherent light. The quantum information may include polarization state information or encryption key information of a photon to be transmitted. For example, the quantum information modulator 113 may generate quantum information by modulating the transmission bit information based on the transmission basis information which may be arbitrarily selected.

The optical attenuator 114 may attenuate the intensity of a signal including quantum information. The optical attenuator 114 may generate a first quantum signal SIG_Q1 having a signal intensity equal to or less than the reference intensity. The optical attenuator 114 may generate the first quantum signal SIG_Q1 and may transmit it to the quantum channel receiver 210 through the quantum channel 310.

In some embodiments, the intensity modulator 112 or the optical attenuator 114 may be omitted. In this case, the quantum information modulator 113 may output the first quantum signal SIG_Q1 including quantum information.

In this case, the first quantum signal SIG_Q1 may have a polarization state of 0° (|H⟩), 90° (|v⟩), 45° (|D⟩), −45° (|A⟩), right circle (|R⟩), left circle (|L⟩) by the quantum information modulator 113. The first quantum signal SIG_Q1 is defined mathematically as follows.

$$|SIG\_Q1\rangle \in \left\{ \begin{array}{c} |H\rangle = [1, 0]^T, |V\rangle = [0, 1]^T, |D\rangle = \frac{1}{\sqrt{2}}[1, 1]^T, |A\rangle = \frac{1}{\sqrt{2}}[1, -1]^T, \\ |R\rangle = \frac{1}{\sqrt{2}}[1, i]^T, |L\rangle = \frac{1}{\sqrt{2}}[1, -i]^T \end{array} \right\}$$

The polarization correction circuit 230 may receive the first quantum signal SIG_Q1 through the quantum channel 310. The polarization correction circuit 230 may receive the circular polarization measurement result RES from the second public channel transceiver 220. The polarization correction circuit 230 may generate a second quantum signal SIG_Q2 by correcting the polarization of the first quantum signal SIG_Q1 based on the circular polarization measurement result RES. For example, the first quantum signal SIG_Q1 may have polarization distortion during transmission, and the second quantum signal SIG_Q2 is a signal obtained by correcting the first quantum signal SIG_Q1 based on the circular polarization measurement result RES.

Specifically, the polarization state of the first quantum signal SIG_Q1 may be distorted by the quantum channel 310, and the distorted first quantum signal ($|SIG\_Q1'\rangle$) may be expressed by Equation 1.

$$|SIG\_Q1'\rangle = U_{CH\_Q}|SIG\_Q1\rangle. \qquad \text{[Equation 1]}$$

Referring to Equation 1, $U_{CH\_Q}$ is a unitary matrix that mathematically expresses the polarization distortion of the quantum channel 310. Similar to Equation 1, the second quantum signal SIG_Q2 ($|SIG\_Q2\rangle$) may be expressed as Equation 2.

$$|SIG\_Q2\rangle = U_{RES}|SIG\_Q1'\rangle. \qquad \text{[Equation 2]}$$

Referring to Equation 2, $U_{RES}$ is a unitary matrix that mathematically expresses an operation performed by the polarization correction circuit 230 based on the circular polarization measurement result RES. Specific details of $U_{RES}$ will be described later with reference to FIG. 3.

The quantum information demodulator 211 may receive the second quantum signal SIG_Q2. The quantum information demodulator 211 may demodulate quantum information from the second quantum signal SIG_Q2 to distinguish encryption key information.

According to an embodiment, the quantum information demodulator 211 may adjust the quantum characteristics of the second quantum signal SIG_Q2. For example, the quantum information demodulator 211 may choose reception basis information and may maintain or change polarization state information of the second quantum signal SIG_Q2 based on the reception basis information. The reception basis information may be arbitrarily selected.

The single photon detector 212 may be connected to the quantum information demodulator 211 to detect the second quantum signal SIG_Q2. For example, the single photon detector 212 may measure the polarization state of the second quantum signal SIG_Q2 to provide the measured information to the second public channel transceiver 220.

Figure 3:
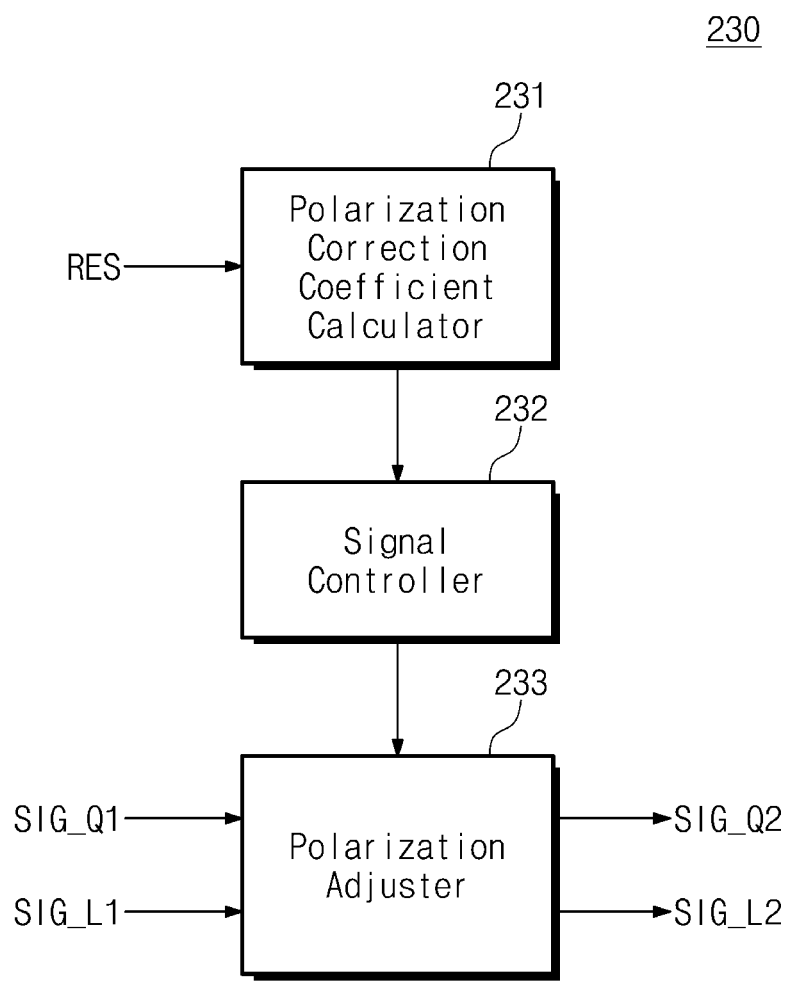
FIG. 3 is a block diagram illustrating an example of a polarization correction circuit of FIG. 2.

FIG. 3 is a block diagram illustrating an example of the polarization correction circuit 230 of FIG. 2. Referring to FIGS. 1 to 3, the polarization correction circuit 230 may include a polarization correction coefficient calculator 231, a signal controller 232, and a polarization adjuster 233.

The polarization correction coefficient calculator 231 may receive the circular polarization measurement result RES from the second public channel transceiver 220. The polarization correction coefficient calculator 231 may calculate a polarization correction coefficient based on the circular polarization measurement result RES. The polarization correction coefficient calculator 231 may provide information on the calculated polarization correction coefficient to the signal controller 232. The signal controller 232 may generate a polarization adjustment signal based on information on the polarization correction coefficient and provide it to the polarization adjuster 233. For example, the polarization adjustment signal may be a correction signal for the right circular polarization or the left circular polarization.

In detail, the operation (e.g., $U_{RES}$ of Equation 2) of the polarization correction circuit 230 may recover only the circular polarization component of the quantum signal transmitted from the quantum channel transmitter 110, which may be expressed as Equation 3.

$$|SIG\_Q2\rangle = \begin{cases} |R\rangle & \text{if } |SIG\_Q1\rangle = |R\rangle \\ |L\rangle & \text{if } |SIG\_Q1\rangle = |L\rangle \\ \alpha|H\rangle + \beta|V\rangle & \text{if } |SIG\_Q1\rangle = |H\rangle \\ \beta|H\rangle - \alpha|V\rangle & \text{if } |SIG\_Q1\rangle = |V\rangle \\ (\alpha+\beta)|H\rangle - (\alpha-\beta)|V\rangle & \text{if } |SIG\_Q1\rangle = |D\rangle \\ (\alpha-\beta)|H\rangle + (\alpha+\beta)|V\rangle & \text{if } |SIG\_Q1\rangle = |A\rangle \end{cases} \qquad \text{[Equation 3]}$$

Referring to Equation 3, $\alpha$ and $\beta$ are an arbitrary complex number having a relationship of $|\alpha|^2+|\beta|^2=1$. For example, for $|SIG\_Q1\rangle \in \{|H\rangle, |V\rangle, |D\rangle, |A\rangle\}$, the Equation 3 can be expressed as $|SIG\_Q1\rangle \neq |SIG\_Q2\rangle$, but this does not affect the performance of the RFI QKD protocol. According to an embodiment, $U_{RES}$ may be composed of two quarter wave plates, and may be implemented by adjusting the angle of each quarter wave plate. The angle of the quarter wave plate for implementation of $U_{RES}$ is based on the circular polarization measurement result RES, and details thereof will be described later in FIG. 5.

Figure 4:
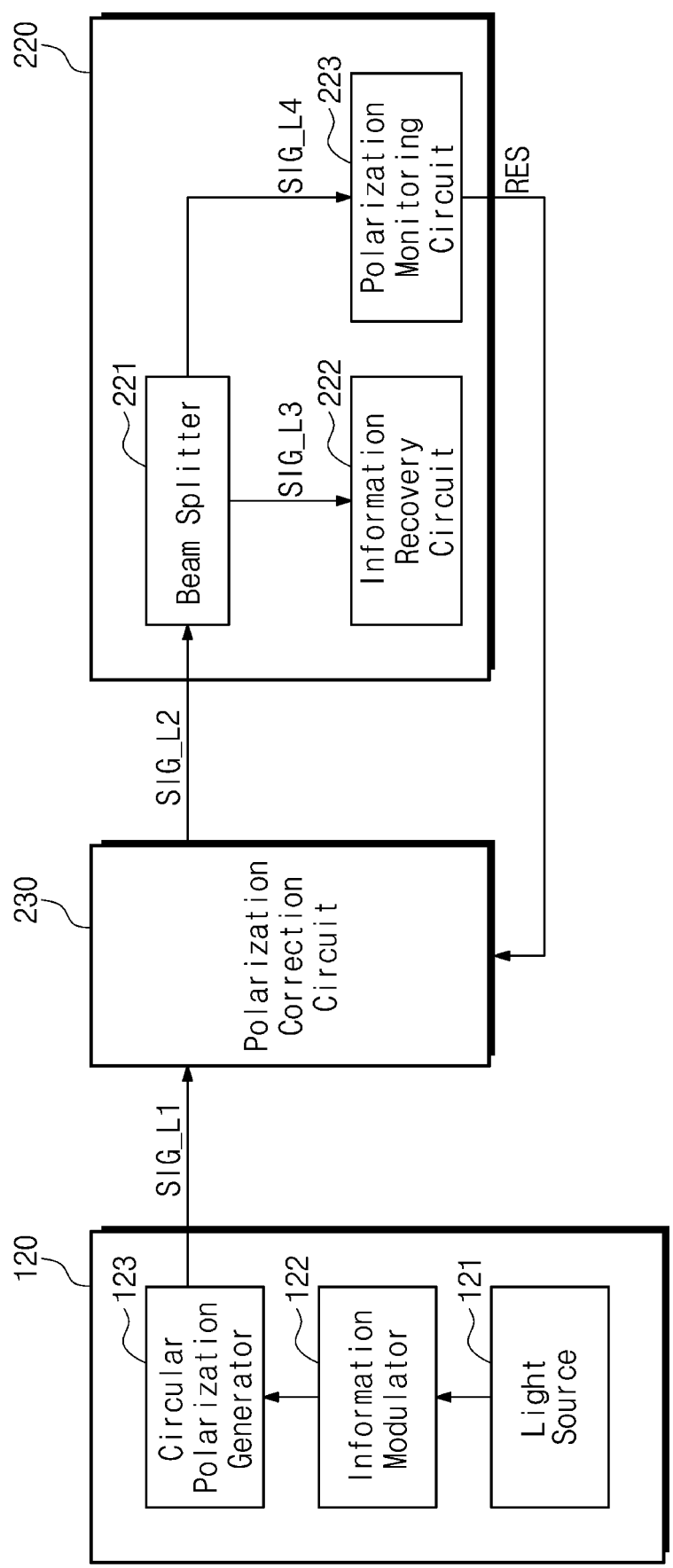
FIG. 4 is a block diagram illustrating examples of a first public channel transceiver and a second public channel transceiver of FIG. 1.

FIG. 4 is a block diagram illustrating examples of a first public channel transceiver and a second public channel transceiver of FIG. 1. Referring to FIGS. 1, 2, and 4, the first public channel transceiver 120 may include a light source 121, an information modulator 122, and a circular polarization generator 123, and the second public channel transceiver 220 may include a beam splitter 221, an information recovery circuit 222, and a polarization monitoring circuit 223.

The light source 121 may generate an optical signal. For example, the light source 121 may include a laser light source. The optical signal generated by the light source 121 may be incident on the information modulator 122. The information modulator 122 may assign additional information for QKD operations such as post-processing and synchronization to the optical signal.

The circular polarization generator 123 may be connected to the information modulator 122. The circular polarization generator 123 may convert the polarization of the optical signal into the circular polarization and may output it. For example, the circular polarization generator 123 may output a first optical signal SIG_L1 having right circular polarization or left circular polarization through a polarization plate. That is, the first optical signal SIG_L1 may have a fixed circular polarization component. The first optical signal SIG_L1 may be transmitted and received through the public channel 320. In this case, the polarization state of the first optical signal SIG_L1 is defined as in Equation 4.

$$|SIG\_L1\rangle = \{|R\rangle = \frac{1}{\sqrt{2}}[1, i]^T, |L\rangle = \frac{1}{\sqrt{2}}[1, -i]^T\} \qquad \text{[Equation 4]}$$

For convenience of description, the case of $|SIG\_L1\rangle = |R\rangle$ is assumed.

The polarization correction circuit 230 may receive the first optical signal SIG_L1 and may perform polarization correction based on the circular polarization measurement result RES. The polarization correction circuit 230 may provide a second optical signal SIG_L2 obtained by performing polarization correction on the first optical signal SIG_L1 to the beam splitter 221. In this case, the second optical signal SIG_L2 is defined as in Equation 5.

$$|SIG\_L2\rangle = U_{RES} U_{CH\_L} |SIG\_L1\rangle \quad \text{[Equation 5]}$$

Referring to Equation 5, $U_{RES}$ is a unitary matrix that mathematically expresses the operation performed by the polarization correction circuit 230 based on the circular polarization measurement result RES, and $U_{CH\_L}$ is a unitary matrix that mathematically expresses the polarization state distortion of the public channel 320.

The beam splitter 221 may receive the second optical signal SIG_L2 through the public channel 320 and the polarization correction circuit 230. The beam splitter 221 may split the second optical signal SIG_L2 into a third optical signal SIG_L3 and a fourth optical signal SIG_L4. The third optical signal SIG_L3 may be provided to the information recovery circuit 222, and the fourth optical signal SIG_L4 may be provided to the polarization monitoring circuit 223.

The information recovery circuit 222 may receive the third optical signal SIG_L3 and may recover additional information from the third optical signal SIG_L3. According to an embodiment, the additional information is information related to the QKD operation, and may include at least one of post-processing related information, synchronization information, and location information of a transceiver. For example, the post-processing related information may include information related to sifting, error correction, privacy amplification, etc.

The polarization monitoring circuit 223 may receive the fourth optical signal SIG_L4 and may measure the circular polarization component from the fourth optical signal SIG_L4. The polarization monitoring circuit 223 may provide the circular polarization measurement result RES, which is a result of measuring the circular polarization component, to the polarization correction circuit 230. Since the beam splitter 221 does not affect the polarization state, the polarization state of the fourth optical signal SIG_L4 is the same as that of the second optical signal SIG_L2 ($|SIG\_L4\rangle = |SIG\_L2\rangle$).

Figure 5:
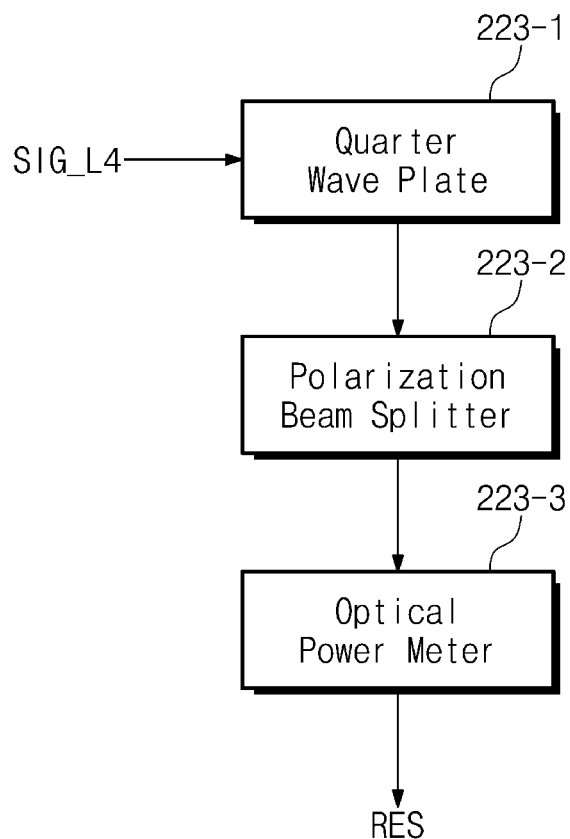
FIG. 5 is a block diagram illustrating an example of a polarization monitoring circuit of FIG. 4.

FIG. 5 is a block diagram illustrating an example of the polarization monitoring circuit 223.

Referring to FIG. 5, the polarization monitoring circuit 223 may include a quarter wave plate 223-1, a polarization beam splitter 223-2, and an optical power meter 223-3. The quarter wave plate 223-1 may change the polarization state of the fourth optical signal SIG_L4. For example, the quarter wave plate 223-1 may make a difference between polarization going on a fast axis and polarization going on a slow axis by a quarter of a wavelength. Using this, when the fourth optical signal SIG_L4 having only the circular polarization component passes through the quarter wave plate 223-1, the fourth optical signal SIG_L4 may have only the linear polarization component.

The polarization beam splitter 223-2 may split the fourth optical signal SIG_L4 depending on a vertical polarization state or a horizontal polarization state. Accordingly, the polarization beam splitter 223-2 may separate only the circular polarization component of the fourth optical signal SIG_L4 through combination with the quarter wave plate 223-1. The separated circular polarization component is provided to the optical power meter 223-3, and the optical power meter 223-3 may measure the intensity of the circular polarization component to generate the circular polarization measurement result RES.

The circular polarization measurement result RES may be provided to the polarization correction circuit 230 and may be used to correct polarization distortion. Specifically, the polarization state after passing through the quarter wave plate 223-1 and the polarization beam splitter 223-2 may be expressed as Equation 6.

$$P_R |SIG\_L4\rangle = P_R U_{RES} U_{CH\_L} |SIG\_L1\rangle \quad \text{[Equation 6]}$$

Referring to Equation 6, $$P_R \left( P_R = \frac{1}{2} \begin{bmatrix} 1 & -i \\ i & 1 \end{bmatrix} \right)$$

represents only the circular polarization component of the fourth optical signal SIG_L4, and the optical power meter 233-3 may measure a value proportional to $\langle SIG\_L4 | P_R | SIG\_L4 \rangle$. When this value is $|SIG\_L4\rangle = |R\rangle$, the maximum value becomes '1'. Therefore, maximizing the measured value of the optical power meter 223-3 is to recover the circular polarization of the polarization-distorted optical signal in the public channel. To achieve this, by adjusting the circular polarization measurement result RES (e.g., by adjusting the angle of the polarization plate constituting the polarization adjuster 233), $U_{RES}$ may be adjusted.

According to an embodiment, since the first quantum signal SIG_Q1 and the first optical signal SIG_L1 may be designed to share the same physical channel with similar optical characteristics (e.g., not the same but similar wavelength band), it may be assumed that the polarization distortion of the first quantum signal SIG_Q1 and the first optical signal SIG_L1 by the channel is the same ($U_{CH\_Q} = U_{CH\_L}$). Accordingly, similarly to the restoration of the circular polarization of the first optical signal SIG_L1 described in FIG. 3, the circular polarization of the first quantum signal SIG_Q1 may also be recovered.

That is, as the QKD system 10 according to the present disclosure allows the first optical signal SIG_L1 of the public channel 320 to have circular polarization, measures the circular polarization component, and uses it to correct the polarization distortion, additional information or preprocessing for correction of polarization distortion may not be required. In addition, it may also enable real-time correction.

FIG. 6 is a block diagram illustrating another example of a first public channel transceiver and a second public channel transceiver of FIG. 1. Referring to FIGS. 1 and 4 to 6, a first public channel transceiver 1120 may include a first light source 1121, a first information modulator 1122, a circular polarization generator 1123, and a second information recovery circuit 1124, and a second public channel transceiver 1220 may include a beam splitter 1221, a first information recovery circuit 1222, a polarization monitoring circuit 1223, a second light source 1224, and a second information modulator 1225.

Since the first light source 1121, the first information modulator 1122, the circular polarization generator 1123, the beam splitter 1221, the first information recovery circuit 1222, and the polarization monitoring circuit 1223 of FIG. 6 are similar to the light source 121, the information modulator 122, the circular polarization generator 123, the beam splitter 221, the information recovery circuit 222, and the polarization monitoring circuit 223, respectively, additional descriptions thereof will be omitted to avoid redundancy.

The second light source 1224 may generate an optical response signal SIG_L1'. For example, the second light source 1224 may include a laser light source. The optical response signal SIG_L1' may include additional information to be transmitted to the first public channel transceiver 1120 in response to the optical signal SIG_L1. According to an embodiment, the second information modulator 1225 may assign additional information for QKD operations such as post-processing and synchronization to the optical response signal SIG_L1'.

The second information recovery circuit 1124 may receive the optical response signal SIG_L1' through the public channel 320. The second information recovery circuit 1124 may recover additional information from the optical response signal SIG_L1'. The recovered information may be used for QKD operation.

FIG. 7 is a flowchart illustrating a method of operating a quantum key distribution system, according to an embodiment of the present disclosure.

Referring to FIGS. 1 and 7, in operation S110, the QKD system 10 may transmit and receive a quantum signal. For example, the quantum channel transmitter 110 may randomly generate one of three transmission bases (Z, X, and Y) in the RFI QKD protocol, and may transmit the quantum signal to the quantum channel receiver 210 through the quantum channel 310. The quantum channel receiver 210 may measure the polarization state by arbitrarily selecting one of the three reception bases (Z, X, and Y).

Operation S110 may be an operation based on the quantum channel 310 of the QKD system 10. Operations S120 to S150 are operations of operating based on the public channel 320 of the QKD system 10, and may be operations of correcting the polarization distortion of the quantum signal generated and transmitted in operation S110 and post-processing the quantum signal.

In operation S120, the QKD system 10 may transmit and receive an optical signal. For example, the first public channel transceiver 120 may generate an optical signal including additional information related to the QKD operation and may transmit it through the public channel 320. According to an embodiment, the first public channel transceiver 120 may convert the polarization of the optical signal into the circular polarization and may transmit it through the public channel 320. The second public channel transceiver 220 may receive the optical signal and may recover additional information.

In operation S130, the QKD system 10 may measure the circular polarization component from the optical signal. For example, the second public channel transceiver 220 may split the optical signal into a first optical signal and a second optical signal, and may measure the circular polarization component from the second optical signal. The first optical signal may be used to recover additional information. According to an embodiment, the additional information may include at least one of post-processing related information, synchronization information, and location information of a transceiver.

According to an embodiment, the second public channel transceiver 220 may include a quarter wave plate, a polarization beam splitter, and an optical power meter to measure the circular polarization component of the second optical signal. The second public channel transceiver 220 may generate the measurement result RES associated with the circular polarization component.

In operation S140, the QKD system 10 may calculate the polarization correction coefficient based on the measurement result RES. For example, the polarization correction circuit 230 may receive the measurement result RES associated with the circular polarization component from the second public channel transceiver 220, and may calculate the polarization correction coefficient for the quantum signal based on the measurement result RES. For example, the polarization correction coefficient may include coefficient correction information associated with a circular polarization basis.

In operation S150, the QKD system 10 may correct polarization distortion based on the polarization correction coefficient. For example, the polarization correction circuit 230 may generate a polarization adjustment signal based on the polarization correction coefficient. In addition, the polarization correction circuit 230 may adjust the polarization of the quantum signal in response to the polarization adjustment signal.

According to an embodiment of the present disclosure, the QKD system may correct the polarization distortion by making the polarization of the optical signal of the public channel to have a circular polarization in a fixed manner. Accordingly, the QKD system may provide a polarization providing method capable of real-time correction at the same time without requiring additional information or pre-processing for correction of polarization distortion.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A quantum key distribution system based on an RFI (reference frame independent) QKD (quantum key distribution) protocol, the quantum key distribution system comprising:

a quantum channel transmitter configured to generate a first quantum signal including quantum information and provide the first quantum signal to an external device through a quantum channel;

a first public channel transceiver configured to generate an optical signal including first additional information related to a QKD operation, and to transmit and receive the optical signal through a public channel;

a second public channel transceiver configured to receive the optical signal through the public channel and to generate a measurement result by measuring a circular polarization component of the optical signal;

a polarization correction circuit configured to receive the first quantum signal from the quantum channel transmitter through the quantum channel, and to generate a second quantum signal by correcting a polarization distortion of the first quantum signal based on the measurement result, the polarization distortion being caused by the quantum channel; and a quantum channel receiver configured to receive the second quantum signal from the polarization correction circuit, and to demodulate the quantum information from the second quantum signal.

2. The quantum key distribution system of claim 1, wherein the quantum channel transmitter includes:

a light source configured to generate a single photon or coherent light;

an intensity modulator connected to the light source and configured to adjust an intensity of the coherent light;

a quantum information modulator configured to modulate the single photon or coherent light to modulate the quantum information; and an optical attenuator configured to attenuate an intensity of a signal output from the quantum information modulator to generate the first quantum signal.

3. The quantum key distribution system of claim 1, wherein the quantum channel receiver includes:

a quantum information demodulator configured to demodulate the quantum information from the second quantum signal; and a single photon detector configured to detect the second quantum signal to measure a polarization state of the second quantum signal.

4. The quantum key distribution system of claim 3, wherein the polarization correction circuit includes:

a polarization correction coefficient calculator configured to receive the measurement result and to calculate a polarization correction coefficient associated with a circular polarization basis based on the measurement result;

a signal controller configured to generate a polarization adjustment signal based on the polarization correction coefficient; and a polarization adjuster configured to adjust a polarization of the first quantum signal in response to the polarization adjustment signal and to generate the second quantum signal.

5. The quantum key distribution system of claim 1, wherein the first public channel transceiver includes:

a first laser light source configured to generate the optical signal;

a first information modulator coupled to the first laser light source and configured to assign the first additional information to the optical signal; and a circular polarization generator connected to the first information modulator to convert a polarization of the optical signal into a circular polarization.

6. The quantum key distribution system of claim 5, wherein the first additional information includes at least one of post-processing related information, synchronization information, and location information of a transceiver.

7. The quantum key distribution system of claim 5, wherein the second public channel transceiver includes:

a beam splitter configured to receive the optical signal through the public channel and to split the optical signal into a first optical signal and a second optical signal;

a first information recovery circuit configured to receive the first optical signal from the beam splitter and to recover the first additional information from the first optical signal; and a polarization monitoring circuit configured to receive the second optical signal from the beam splitter and to measure the circular polarization component from the second optical signal.

8. The quantum key distribution system of claim 7, wherein the polarization monitoring circuit includes:

a quarter wave plate configured to change a polarization state of the second optical signal;

a polarization beam splitter configured to split the second optical signal based on the polarization state; and an optical power meter configured to measure an intensity of a splitted optical signal to generate the measurement result associated with the circular polarization component.

9. The quantum key distribution system of claim 7, wherein the second public channel transceiver further includes:

a second laser light source configured to generate an optical response signal to be transmitted to the first public channel transceiver in response to the optical signal; and a second information modulator configured to assign second additional information related to the QKD to the optical response signal.

10. The quantum key distribution system of claim 9, wherein the first public channel transceiver further includes a second information recovery circuit configured to receive the optical response signal and to recover the second additional information from the optical response signal.

11. A method of operating a quantum key distribution system based on an RFI (reference frame independent) QKD (quantum key distribution) protocol, the method comprising:

generating, by a quantum channel transmitter, a quantum signal including quantum information and transmitting the generated quantum signal to a quantum channel;

receiving, by a quantum channel receiver, the quantum signal through the quantum channel;

generating, by a first public channel transceiver, an optical signal including additional information related to a QKD operation, and transmitting the optical signal to a public channel;

receiving, by a second public channel transceiver, the optical signal through the public channel;

generating, by the second public channel transceiver, a measurement result by measuring a circular polarization component from the optical signal; and correcting, by a polarization correction circuit, a polarization distortion of the quantum signal based on the measurement result, the polarization distortion being caused by the quantum channel.

12. The method of claim 11, wherein the transmitting of the optical signal to the public channel includes making a polarization of the optical signal into a circular polarization.

13. The method of claim 11, wherein the generating of the measurement result includes:

splitting the optical signal into a first optical signal and a second optical signal;

recovering the additional information from the first optical signal; and measuring the circular polarization component from the second optical signal.

14. The method of claim 13, wherein the additional information includes at least one of post-processing related information, synchronization information, and location information of a transceiver.

15. The method of claim 11, wherein the correcting of the polarization distortion includes:

calculating a polarization correction coefficient associated with a circular polarization basis based on the measurement result;

generating a polarization adjustment signal based on the polarization correction coefficient; and adjusting a polarization of the quantum signal in response to the polarization adjustment signal.

* * * * *